US010796585B2

(12) United States Patent
Greenwood

(10) Patent No.: US 10,796,585 B2
(45) Date of Patent: Oct. 6, 2020

(54) DEVICE FOR PROVIDING REAL-TIME ROTORCRAFT NOISE ABATEMENT INFORMATION

(71) Applicant: UNITED STATES OF AMERICA AS REPRESENTED BY THE ADMINISTRATOR OF NASA, Washington, DC (US)

(72) Inventor: Eric Greenwood, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 202 days.

(21) Appl. No.: 15/995,563

(22) Filed: Jun. 1, 2018

(65) Prior Publication Data

US 2018/0366007 A1  Dec. 20, 2018

Related U.S. Application Data

(60) Provisional application No. 62/518,252, filed on Jun. 12, 2017.

(51) Int. Cl.
*G08G 5/00* (2006.01)
*G05D 1/08* (2006.01)
(Continued)

(52) U.S. Cl.
CPC ......... *G08G 5/0021* (2013.01); *B64C 27/001* (2013.01); *G01C 21/00* (2013.01);
(Continued)

(58) Field of Classification Search
CPC .... G08G 5/0021; G08G 5/0039; G01C 21/00; G05D 1/0808; G05D 1/042; G05D 1/0202; B64C 27/001
See application file for complete search history.

(56) References Cited

U.S. PATENT DOCUMENTS 3,289,204 A * 11/1966 Murray ................. G01S 13/505
                                                         342/58
3,936,606 A *  2/1976 Wanke ................. F16L 55/0333
                                                         381/71.5
(Continued)

FOREIGN PATENT DOCUMENTS

JP         2006044577 A  *  2/2006  ............. G01C 21/32
WO    WO-2005078382 A1  *  8/2005  ............. B82Y 10/00
(Continued)

OTHER PUBLICATIONS

Greenwood, E. et al., "A Maneuvering Flight Noise Model for Helicopter Mission Planning," American Helicopter Society 71st Annual Forum, May 2015.
(Continued)

*Primary Examiner* — Behrang Badii
*Assistant Examiner* — Jalal C Coduroglu
(74) *Attorney, Agent, or Firm* — Robin W. Edwards; Helen M. Galus

(57) ABSTRACT

A method and device provide a rotorcraft operator with real-time information concerning acoustic radiation on a region of the ground in the vicinity of the rotorcraft. A noise radiation model and at least one measured flight variable determine a high noise region on the ground that is bounded by a predefined noise level threshold. The method/device may include a display showing the high noise region and the position of the rotorcraft on a map. The rotorcraft operator may also be provided with real-time Blade-Vortex Interaction ("BVI") avoidance guidance while the rotorcraft is in flight.

20 Claims, 10 Drawing Sheets

(51) Int. Cl.
   G05D 1/04      (2006.01)
   G05D 1/02      (2020.01)
   B64C 27/00     (2006.01)
   G01C 21/00     (2006.01)

(52) U.S. Cl.
   CPC .......... *G05D 1/0202* (2013.01); *G05D 1/042* (2013.01); *G05D 1/0808* (2013.01); *G08G 5/0039* (2013.01)

(56) References Cited

U.S. PATENT DOCUMENTS

| | | | | |
|---|---|---|---|---|
| 4,060,809 | A * | 11/1977 | Baghdady | G01S 1/40 342/451 |
| 4,737,788 | A * | 4/1988 | Kennedy | G01S 13/50 342/29 |
| 5,114,094 | A * | 5/1992 | Harris | F42B 10/661 244/3.22 |
| 5,491,301 | A * | 2/1996 | Akiba | H01L 23/552 174/250 |
| 5,520,356 | A * | 5/1996 | Ensley | B64G 1/409 244/171.1 |
| 5,584,661 | A * | 12/1996 | Brooks | B64C 27/467 416/238 |
| 5,588,032 | A * | 12/1996 | Johnson | A61B 5/4312 378/8 |
| 6,005,916 | A * | 12/1999 | Johnson | A61B 5/05 378/87 |
| 6,092,990 | A * | 7/2000 | Hassan | B64C 23/04 244/130 |
| 6,224,014 | B1 * | 5/2001 | Dussac | B64C 27/001 244/17.27 |
| 6,227,036 | B1 * | 5/2001 | Yonak | G01M 3/24 250/573 |
| 6,234,751 | B1 * | 5/2001 | Hassan | B64C 23/04 244/130 |
| 6,471,157 | B1 * | 10/2002 | Streett | B64C 23/06 244/1 N |
| 7,383,104 | B2 * | 6/2008 | Ishii | G01C 21/32 244/1 N |
| 7,576,695 | B2 * | 8/2009 | Smith | G01H 17/00 342/457 |
| 7,889,133 | B2 * | 2/2011 | Smith | G01H 17/00 342/450 |
| 7,908,077 | B2 * | 3/2011 | Smith | G06Q 10/10 340/945 |
| 8,344,910 | B2 * | 1/2013 | Wang | G01H 3/14 340/945 |
| 8,380,365 | B2 * | 2/2013 | Marze | B64D 45/04 244/1 N |
| 8,380,371 | B2 * | 2/2013 | DeJonge | G05D 1/0661 701/15 |
| 8,629,788 | B1 * | 1/2014 | Greenleaf | G01S 13/953 340/968 |
| 8,670,881 | B2 * | 3/2014 | DeJonge | G05D 1/0661 701/15 |
| 9,218,742 | B2 * | 12/2015 | Barry | G08G 5/0026 |
| 9,376,983 | B2 * | 6/2016 | Moeckly | F02D 45/00 |
| 9,493,249 | B2 * | 11/2016 | Shukla | G01H 17/00 |
| 9,579,042 | B2 * | 2/2017 | Zur | A61N 7/02 |
| 9,784,887 | B1 * | 10/2017 | Ulmer | G01S 17/95 |
| 10,435,148 | B2 * | 10/2019 | Kearney-Fischer | B64C 39/024 |
| 2002/0176236 | A1 * | 11/2002 | Iguchi | H05K 1/0216 361/753 |
| 2004/0193349 | A1 * | 9/2004 | Flann | A01B 69/008 701/50 |
| 2006/0084859 | A1 * | 4/2006 | Johnson | A61B 8/00 600/407 |
| 2006/0287596 | A1 * | 12/2006 | Johnson | A61B 8/14 600/437 |
| 2007/0047278 | A1 * | 3/2007 | Yamamoto | H01L 23/552 363/144 |
| 2008/0163700 | A1 * | 7/2008 | Huang | G01B 17/025 73/861.25 |
| 2009/0090167 | A1 * | 4/2009 | Groves | G01N 1/26 73/31.01 |
| 2009/0095054 | A1 * | 4/2009 | Groves | G01N 1/26 73/31.01 |
| 2009/0104594 | A1 * | 4/2009 | Webb | C12M 41/48 435/3 |
| 2009/0113990 | A1 * | 5/2009 | Groves | G01N 1/2273 73/31.01 |
| 2011/0001637 | A1 * | 1/2011 | Spiegel | G01D 7/02 340/971 |
| 2012/0026317 | A1 * | 2/2012 | Nakahira | H04N 7/183 348/92 |
| 2013/0201316 | A1 * | 8/2013 | Binder | H04L 67/12 348/77 |
| 2014/0270053 | A1 * | 9/2014 | Larson | A61B 6/032 378/4 |
| 2014/0338447 | A1 * | 11/2014 | Sharpe | A01K 29/005 73/431 |
| 2015/0265856 | A1 * | 9/2015 | Hill | A61N 7/02 601/3 |
| 2015/0316511 | A1 * | 11/2015 | Guo | H04B 10/27 398/140 |
| 2016/0077507 | A1 * | 3/2016 | Sheble | G06Q 50/06 700/295 |
| 2016/0157355 | A1 * | 6/2016 | Paoletti | G06F 30/367 716/122 |
| 2016/0320219 | A1 * | 11/2016 | Hellevang | G01F 1/66 |
| 2016/0327419 | A1 * | 11/2016 | Hellevang | G01F 1/66 |
| 2017/0076027 | A1 * | 3/2017 | Iwanami | G06F 30/398 |
| 2018/0319491 | A1 * | 11/2018 | Kearney-Fischer | B64C 39/024 |
| 2018/0366007 | A1 * | 12/2018 | Greenwood | G08G 5/0021 |
| 2019/0228777 | A1 * | 7/2019 | Papadimitriou | G01M 5/0033 |
| 2020/0094411 | A1 * | 3/2020 | Tan | B25J 9/16 |

FOREIGN PATENT DOCUMENTS

| | | | | |
|---|---|---|---|---|
| WO | WO-2009106039 | A2 * | 9/2009 | G01D 7/02 |
| WO | WO-2017149526 | A2 * | 9/2017 | G01S 15/08 |

OTHER PUBLICATIONS

"La Helicopter Noise Initiative," http://heli-noise-la.com, Accessed: Mar. 5, 2017.

"Westchester County Airport Noise Abatement," http://airport.westchestergov.com/environmental-management-system/noise-abatement, Accessed: Mar. 5, 2017.

"NYCEDC and Helicopter Tourism & Jobs Council Announce New Measures to Reduce Helicopter Noise and Impacts Across New York City," https://www.nycedc.com/press-release/nycedcand-helicopter-tourism-jobs-council-announce-new-measures-reduce-helicopter, Accessed: Mar. 5, 2017, Feb. 2016.

Helicopter Association International Fly Neighborly Committee, Fly Neighborly Guide, Helicopter Association International, 2007, third edition, Alexandria, Virginia.

Jacobs, E. W. et al., "The Development and Flight Test Demonstration of Noise Abatement Approach Procedures for the Sikorsky S-76," AHS Technical Specialists' Meeting for Rotorcraft Acoustics and Aerodynamics. Oct. 1997.

E. Greenwood et al., "Helicopter External Noise Radiation in Turning Flight: Theory and Experiment," American Helicopter Society 63rd Annual Forum, May 2007.

Sickenberger, R. et al., "Helicopter Near-Horizon Harmonic Noise Radiation due to Cyclic Pitch Control," American Helicopter Society 67th Annual Forum, May 2011.

Greenwood, E. et al., "The Effects of Crosswind Flight on Rotor Harmonic Noise Radiation," American Helicopter Society 69th Annual Forum, May 2013.

Greenwood, E. et al., "The Effects of Ambient Conditions on Helicopter Harmonic Noise Radiation: Theory and Experiment," American Helicopter Society 72nd Annual Forum, May 2016.

(56) References Cited

OTHER PUBLICATIONS

Watts, M. E. et al., "Measurement and Characterization of Helicopter Noise at Different Altitudes," American Helicopter Society 72nd Annual Forum, May 2016.
Schmitz, F. H., "Reduction of Blade-Vortex Interaction (BVI) Noise through X-Force Control," Journal of the American Helicopter Society, 1998, pp. 14-24, vol. 43, (1).
Greenwood, E et al., "A Parameter Identification Method for Helicopter Noise Source Identification and Physics-Based Semi-Empirical Modeling," American Helicopter Society 66th Annual Forum, May 2010.
Greenwood, E. "Funda mental Rotorcraft Acoustic Modeling from Experiments (FRAME)," Ph.D. thesis, Jan. 2011, University of Maryland.
Greenwood, E. et al., "A Semiempirical Noise Modeling Method for Helicopter Maneuvering Flight Operations," Journal of the American Helicopter Society, 2015, pp. 1-13. vol. 60, (2).
Sickenberger, R., "Modeling Helicopter Near-Horizon Harmonic Noise due to Transient Maneuvers," Ph.D. thesis, May 2013, University of Maryland.
Watts, M. E. et al., "Maneuver Acoustic Flight Test of the Bell 430 Helicopter Data Report," TM2014-218266, NASA, 2014.
Greenwood. E., "Helicopter Flight Procedures for Community Noise Reduction," American Helicopter Society 73rd Annual Forum, May 2017.
Bass, H. E. et al., "Atmospheric absorption of sound: Further developments," The Journal of the Acoustical Society of America, 1995, pp. 680-683. vol. 97, (1).
Alefeld, G. E. et al., "Algorithm 748: Enclosing Zeros of Continuous Functions," ACM Transactions on Mathematical Software, 1995, pp. 327-344, vol. 21, (3).
Xiaonan J. et al., "The design and evaluation methodologies of helmet-mounted display symbology," 23rd International Conference on Mechatronics and Machine Vision in Practice (M2VP), Nov. 2016.
Lueken, T. et al., "Helmet mounted display supporting helicopter missions during en route flight and landing," SPIE Degraded Visual Environments: Enhanced, Synthetic, and External Vision Solutions, May 2016, vol. 9839. doi: 10.1117/12.2225440.
Lucas, M. J. et al., "Rotorcraft Noise Model," AHS Technical Specialists' Meeting for Rotorcraft Acoustics and Aerodynamics, Oct. 1997.
Conner, D. A. et al., "A Tool for Low Noise Procedures Design and Community Noise Impact Assessment: The Rotorcraft Noise Model (RNM)," 2002, Heli Japan.
Page, J. A. et al., "Rotorcraft Noise Model Technical Reference and User Manual," Wyle, Feb. 2008.
Page, J. A. et al., "Advanced Acoustic Model Technical Reference and User Manual," SERDP, May 2009, pp. 5-38, WP-1304.
Spiegel, P. et al., "Highly Instrumented BO105 and EC135-FHS Aeroacoustic Flight Tests including Maneuver Flights," American Helicopter Society 61st Annual Forum, Jun. 2005.
Guntzer, F. et al., "Genetic Optimizations of EC-135 Noise Abatement Flight Procedures using an Aeroacoustic Database," 35th European Rotorcraft Forum, Sep. 2009.
Gopalan, G., "Quasi-Static Acoustic Mapping of Helicopter Blade Vortex Interaction Noise," Ph.D. thesis, 2004, pp. 168-248, University of Maryland.
Sim, B. W. et al., "Blade-Vortex interaction (BVI) Noise of Helicopters Operating in Horizontal Wind Shear," American Helicopter Society 61st Annual Forum, May 2005.
Schmitz , F. H. et al, "Measurement and Characterization of Helicopter Noise in Steady-State and Maneuvering Flight," American Helicopter Society 63rd Annual Forum, May 2007.
Zefran, M. et al., "Planning of Smooth Motions on SE(3)," IEEE International Conference on Robotics and Automation, Apr. 1, 1996, vol. 1. doi:10.1109/ROBOT.1996.503583.
Reinsch, C. H., "Smoothing by Spline Functions," Numerische Mathematik, 1967, pp. 177-183, vol. 10.
Watts, M.. E. et al., "Maneuver Acoustic Flight Test the Bell 430 Helicopter." American Helicopter Society 68th Annual Forum, May 2012.
Sibson, R. "A Brief Description of Natural Neighbour Interpolation," Interpreting Multivariate Data, 1981, pp. 21-36, John Wiley & Sons.
Sickenberger, R. D. et al., "An Optics-Based Tip—Path Plane Tracking System for Rotorcraft Applications," AIAA, Navigation and Control Conference, AIAA 2008-7315, Aug. 2008.
Visser, H. G. et al., "Optimization of Rotorcraft Simultaneous Noninterfering Noise Abatement Approach Procedures," Journal of Aircraft, Nov.-Dec. 2009, pp. 2156-2161, vol. 46, (6).
Padula, S. L. et al., "Design of Quiet Rotorcraft Approach Trajectories," NASA TM 2009-215771, 2009.
Hindson, W. S. et al., "Operational Tests of Noise Abatement Approaches for Rotorcraft Using Differential GPS for Guidance," American Helicopter Society 51st Annual Forum, May 1995.
Gopalan, G. et al., "Longitudinal-Plane Simultaneous Noninterfering Approach Trajectory Design for Noise Minimization," American Helicopter Society 59th Annual Forum, May 2003.
Morris, R. A. et al., "Designing Noise-Minimal Rotorcraft Approach Trajectories," ACM Trans. Intell. Syst. Technol., Apr. 2016, pp. 58:1-58:25, vol. 7 (4).
Hargraves, C. R. et al.., "Direct trajectory optimization using nonlinear programming and collocation," Journal of Guidance, Control, and Dynamics, 1987, pp. 338-342, vol. 10 (4).
Ingber, L. et al., "Adaptive Simulated Annealing," Stochastic Global Optimization an its Applications, Springer, 2012, pp. 33-62.
Boggs , P. T. et al., "Sequential Quadratic Programming," Acta Numerica, 1995, pp. 1-51, vol. 4.
Cassis, J. H. et al., "On implementation of the Extended Interior Penalty Function," International Journal for Numerical Methods in Engineering, 1976, pp. 1-23, vol. 10, (1).
Decker, W. A. et al., "Use of a Portable Programmable Guidance Display in Support of Helicopter Noise Testing," American Helicopter Society 63rd Annual Forum, May 2007.

* cited by examiner

DEVICE FOR PROVIDING REAL-TIME ROTORCRAFT NOISE ABATEMENT INFORMATION

CROSS-REFERENCE TO RELATED PATENT APPLICATION

This patent application claims the benefit of and priority to U.S. Provisional Application No. 62/518,252, filed on Jun. 12, 2017, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Rotorcraft typically operate near the ground throughout the duration of the operation. For this reason, public acceptance of civil rotorcraft may be limited due to annoyance caused by rotor noise radiation.

The magnitude and direction of rotor noise radiation is determined by the aerodynamic operating state of the rotor. Rotor noise is generated from several sources, including thickness, loading, high-speed impulsive, and broadband. All of these sources are influenced by the rotor operating state. An impulsive form of loading noise called Blade-Vortex Interaction ("BVI") occurs when the wake vortex trailed by a preceding rotor blade from the front of the rotor disk passes near a rotor blade in the rear of the rotor disk. The wake vortex causes a rapid change in the blade loading, which results in the generation of high amplitude, impulsive, and highly directional noise. Due to the impulsive nature of this noise source, Blade-Vortex Interaction usually determines the size and shape of the ground footprint over which the rotorcraft produces excessive annoying levels of noise. The occurrence, magnitude, and directionality of Blade-Vortex Interaction noise is sensitive to the rotor operating state because it is dependent on the relative positions of the rotor and its vortex wake. Blade-Vortex Interaction frequently occurs during descending flight, decelerating flight, turning flight, and unsteady maneuvering flight conditions where the rotor wake convects back through the rotor disk.

U.S. Pat. No. 7,383,104, generally describes a method of generating maps showing noise contours for a flying aircraft for display to the pilots. The invention uses a table of aircraft noise generation data as a function of bearing angle, angle of employment, airspeed, and flight path angle. These noise generation data are interpolated to the current condition of the aircraft and then propagated to points on the ground to generate ground noise level contours. These contours are then displayed on a map of the current operating area.

U.S. Pat. No. 8,380,365 describes a method of estimating the sound nuisance level outside of an aircraft in real time. Noise data are collected from microphones attached to the aircraft in steady flight and related to two components of the airspeed, resulting in a model of external noise levels as a function of the two air speed components. Then, real time measurements of the two components of the airspeed can be referenced to the model to determine an overall estimate of the sound noise level of external noise, which can then be displayed to the pilot.

U.S. Patent Publication No. 20110001637 describes a method for displaying the noise level of a rotary-wing aircraft. The system functions by determining the current drive-train torque of the aircraft and the forward speed of the aircraft and relating these to a database of helicopter ground-noise measurements to determine the current noise level.

Known systems/processes may not account for the effects of maneuvering flight on noise emission, and may assume that rotor noise emission at any instant in time can be related to steady-flight measurements of noise data for specific combinations of airspeed, flight path angle, or torque. Recent research has demonstrated that this limitation can lead to underprediction of rotor noise emissions. (See e.g. Greenwood, E., Rau, R., May, B., and Hobbs, C., "A Maneuvering Flight Noise Model for Helicopter Mission Planning," American Helicopter Society 71st Annual Forum, May 2015).

Known approaches also may not account for changes in rotor noise generation due to changes in ambient atmospheric conditions. Ambient conditions can vary due to flight altitude above sea level as well as local weather conditions. These changes in ambient atmospheric conditions have been shown to result in significant changes in radiated noise levels for the same airspeed, flight path angle, and/or torque (See e.g. Greenwood, E., Sim, B., and Boyd, D., "The Effects of Ambient Conditions on Helicopter Harmonic Noise Radiation," American Helicopter Society 72nd Annual Forum, May 2016).

The disclosures of U.S. Pat. No. 8,380,365 and U.S. Patent Publication No. 20110001637 provide an overall indication of emitted noise levels from the vehicle, but not the directionality of the radiated noise nor the region on the ground where people are likely to be annoyed by the emitted noise. This may limit the ability of the pilot to direct noise away from noise sensitive areas, for example by turning or increasing the altitude above ground.

BRIEF SUMMARY OF THE INVENTION

The present disclosure relates to providing rotorcraft operators with information about annoying noise levels currently being emitted by the rotorcraft and its effects on the ground, whereby corrective action can be taken to change the operating state of the vehicle to minimize or avoid annoyance by individuals on the ground due to the rotor noise sources, including Blade-Vortex Interaction.

One aspect of the present disclosure is a method of providing a rotorcraft operator with real-time information concerning acoustic radiation on a region of the ground in the vicinity of the rotorcraft. A noise radiation model and at least one measured flight variable that is measured while the rotorcraft is in flight are utilized to determine a high noise region on the ground that is bounded by a predefined noise level threshold such that the noise level within the high noise region exceeds the predefined noise level threshold. A visual display includes the high noise region superimposed on a map, and an indicator showing the position of the rotorcraft on the map. The high noise region and the rotorcraft position indicator are rapidly and continuously updated at small time intervals while the rotorcraft is in flight to thereby provide the rotorcraft operator with real-time information concerning acoustic radiation on the ground in the vicinity of the rotorcraft due to noise from the rotorcraft. Real-time Blade- Vortex Interaction ("BVI") avoidance guidance may also be provided to the rotorcraft operator while the rotorcraft is in flight.

Another aspect of the present disclosure is a device that is configured to inform the rotorcraft operator of the acoustic impact of rotor noise radiation in real time so that the flight condition of the vehicle (rotorcraft) can be changed to reduce and/or redirect rotor noise away from noise sensitive areas.

A method according to the present disclosure may including the following steps.

Step A1) Acoustic measurements or predictions of the rotorcraft are made over a range of operating conditions. These operating conditions are defined using a set of nondimensional parameters which may include the rotor advance ratio, hover tip Mach number, angle of attack, and thrust coefficient. These nondimensional parameters may be used to define the rotor aerodynamic and acoustic state. However, there are other algebraically equivalent parameter sets that may be used. The measured or predicted acoustic pressures are nondimensionalized by the air density times the square of the speed of sound, resulting in time histories of the nondimensional acoustic pressure coefficient. This process is repeated for each rotor on the rotorcraft/vehicle (e.g. the main and tail rotors of a conventional single main rotor helicopter).

Step A2) A nondimensional analytical rotor noise model is fitted to the nondimensionalized acoustic data for the vehicle using parameter identification techniques. (e.g., Greenwood, E., Fundamental Rotorcraft Acoustic Modeling from Experiments (FRAME). Ph.D. Dissertation, University of Maryland, 2011.)

Step A3) The nondimensional analytical rotor noise model is applied to generate a database of acoustic source spheres describing source noise levels as a function of emission angle and rotor operating states as parameterized by the set of four nondimensional parameters for each rotor on the rotorcraft. Because a model is used to generate this database, it can span a very wide range of operating conditions, such as those experienced under maneuvering flight conditions or for various rotorcraft configurations or ambient atmospheric conditions.

Step A4) An inertial measurement unit is installed in the rotorcraft that provides measurement of the vehicle's inertial position, velocity, and acceleration. Optional measurements of the vehicle orientation, aerodynamic velocity or wind velocity, static pressure, outside air temperature, or rotor rotational speeds can be used to further increase the accuracy of the rotorcraft real time noise prediction.

Step A5) Measurements from the inertial measurement unit of step A4 may be read in to a real time noise calculation computer on board the rotorcraft during flight. The computer combines the measurements with a point mass model of the rotorcraft to estimate the aerodynamic velocity vector, effective flight path angle including acceleration effects, load factor, and rotor rotational speeds of the rotorcraft. These parameters are then related to the four nondimensional parameters that define the rotor operating state using either the measured air temperature and pressure or an estimate based on the altitude of the vehicle.

Step A6) The database of acoustic spheres is stored in memory of the on board real time noise calculation computer described above. An acoustic sphere representing the current rotorcraft operating state is generated by interpolating the noise levels contained in each sphere by the nondimensional rotor operating states for each rotor. These noise levels are redimensionalized by the current ambient air density and speed of sound calculated from the air temperature and pressure determined in step A5. The total noise of the rotorcraft is determined by summing the contributions of each rotor to form a single acoustic sphere for the full vehicle at the current time step.

Step A7) The annoyance footprint of the vehicle (rotorcraft) is determined by first orienting the current full vehicle acoustic sphere with the orientation of the vehicle with respect to the ground. This can be either the measured orientation of the vehicle or an estimated orientation derived from the point mass model described in step A5. Then the annoyance range of the vehicle can be determined by propagating noise levels from the sphere surface to the ground using either a straight ray or ray tracing algorithm. The calculation efficiency can optionally be improved by precalculating the effects of atmospheric absorption during creation of the acoustic database in step A3 and interpolating these values along with the source noise levels in step A6. A root finding algorithm is used to efficiently determine the annoyance range from the vehicle at which ground noise levels meet a predefined annoyance threshold value, for example 65 dBA. This process is repeated for each bearing around the rotorcraft, describing an annoyance footprint within which populations will be annoyed by the currently emitted rotorcraft noise.

Step A8) The current source noise intensity is calculated by averaging the noise levels at all emission angles on the current full vehicle acoustic sphere.

Step A9) The Blade-Vortex Interaction (BVI) noise avoidance value is computed by calculating the BVI miss distance and the change in miss distance with changes in the main rotor angle of attack, advance ratio, hover tip Mach number, and thrust coefficient (or equivalent nondimensional parameters) for the current rotor operating condition (i.e., the miss distance gradient). If the miss distance is greater than a predefined threshold where significant BVI does not occur, the avoidance value is set to zero. Otherwise, the BVI avoidance values are set in proportion to the magnitude of the miss distance gradient.

Step A10) The current annoyance footprint calculated in step A7, the source noise intensity calculated in A8, and the BVI avoidance values calculated in step A9 are transmitted to an acoustic display unit mounted within view of the rotorcraft pilot or operator. This display unit also reads in the current vehicle position and velocity provided in step A4.

Step A11) The noise display unit provides a visual indication of the source noise intensity provided in step A8 that relays the current acoustic state of the rotorcraft to the pilot or operator.

Step A12) The noise display unit provides a visual indication of the BVI avoidance values provided in step A9. When the main rotor angle of attack value is positive, guidance is provided to the pilot or operator indicating that the rotorcraft can avoid BVI noise by climbing or accelerating to push the rotor wake farther below the rotor thereby reducing BVI. Likewise, when the main rotor angle of attack value is negative, guidance is provided indicating that the rotorcraft can avoid BVI noise by descending or decelerating to push the rotor wake farther above the rotor to avoid BVI. The greater the magnitude of the avoidance value, the larger the corrective action indicated by the BVI avoidance guidance indication.

Step A13) The annoyance footprint of the vehicle is projected around an indication of the vehicle position on a map of the current operating area stored in the display unit memory. Map data indicated known populated or otherwise noise sensitive areas may be loaded into the display unit and displayed. The noise display unit, noise calculation computer, inertial measurement unit, and other sensors may be separate units or integrated into the same hardware, such as a portable tablet computer or integrated into existing aircraft avionics.

In use, the rotorcraft pilot or operator activates the device before or during operation of the rotorcraft. The device displays the noise abatement information through the display unit, informing the pilot (operator) about the current acoustic state of the vehicle and providing guidance on how to change the vehicle performance and acoustic state to avoid objectionable BVI noise. Annoyance footprint information can be used by the pilot or operator to change the flight path of the vehicle such that the annoyance footprint will not extend into noise sensitive areas.

The device may be coupled with a rotorcraft flight simulator for use as a noise abatement flight procedure training tool. When used in connection with a simulator, measurements of the rotorcraft parameters are replaced by simulated values.

The noise display unit may comprise a helmet mounted optical device that projects the current annoyance footprint on to the apparent ground surface as viewed by the rotorcraft pilot or operator. Indication of the source noise intensity and BVI avoidance guidance may also be projected.

BVI avoidance guidance may be provided through haptic feedback on the flight controls, increasing cyclic or other control stick pressure or shaking the control stick as it is moved in directions where high BVI noise is predicted thereby encouraging the pilot to avoid high BVI noise acoustic states.

BVI avoidance guidance information may also be provided to the stability augmentation system or fly-by-wire flight control system of the rotorcraft, so that the response of the vehicle towards high noise flight conditions is reduced. Principals of the underlying noise prediction method are known (e.g. Greenwood, E., Rau, R., May, B., and Hobbs, C., "A Maneuvering Flight Noise Model for Helicopter Mission Planning," presented at the American Helicopter Society 71st Annual Forum, Virginia Beach, Va. May 2015).

These and other features, advantages, and objects of the present invention will be further understood and appreciated by those skilled in the art by reference to the following specification, claims, and appended drawings.

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1A-1D, a rotorcraft such as helicopter 1 may include a main rotor blade 2 and a tail rotor 3. During cruise flight conditions the noise levels may be dominated by tail rotor noise sources. However, the primary cause of the noisiest flight conditions is typically main rotor Blade-Vortex Interaction ("BVI").

As discussed in more detail below, one aspect of the present disclosure is a real-time approach to modeling the noise of helicopters which can be used by rotorcraft operators (pilots) to reduce community noise impact. The present disclosure provides a way to allow the pilot of the helicopter to see how the current operating state results in noise on the ground. In addition to giving the pilot feedback tailored to the current operating conditions to the helicopter 1, the model output allows the pilot to identify the regions on the ground where the annoying levels of noise are radiated, so that helicopter operation can be adjusted to direct noise away from densely populated or noise sensitive areas.

Figure 1A:
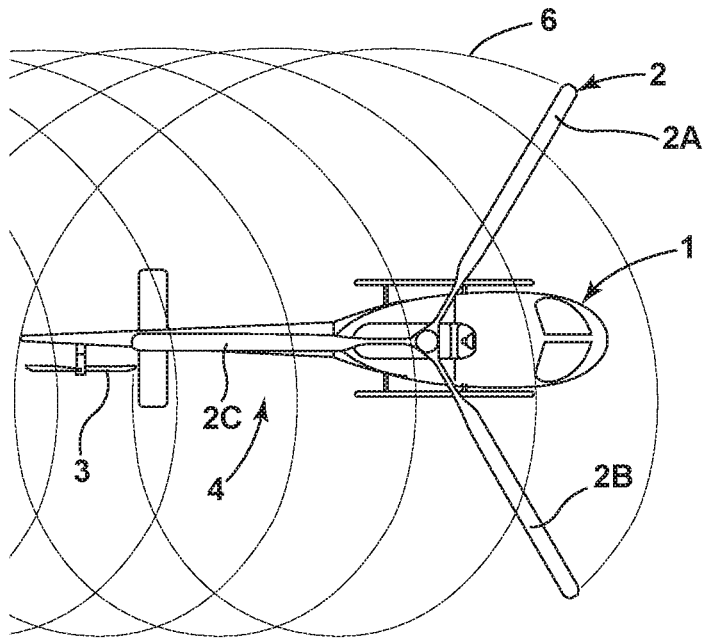
FIG. 1A is a partially schematic top plan view of a rotorcraft (helicopter) in flight showing wake geometry governing Blade-Vortex Interaction ("BVI") noise.

BVI occurs when the blades 2C of the rotor disc or blade 2 pass close by the tip vortices 6 formed previously near the front rotor disc 2. The interaction between the tip vortex 6 and the main rotor blade 2 causes rapid fluctuation of the aerodynamic load on the blades 2A-2C, which results in the radiation of highly impulsive, and therefore annoying, noise. The directivity of BVI noise is a function of the angle between the tip vortex 6 and the azimuth angle of the blade 2 during the interaction, which is determined by the top view geometry of the wake as shown in FIG. 1A.

Figure 1B:
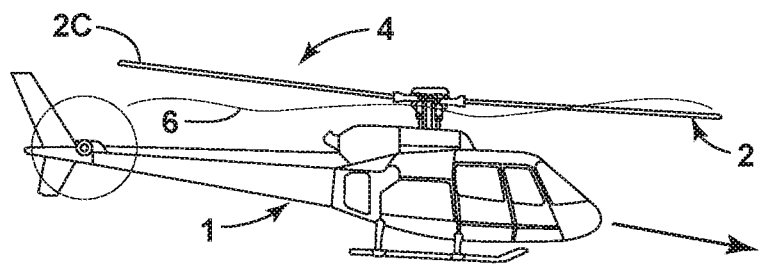
FIG. 1B is a partially schematic side elevational view of a rotorcraft showing wake geometry governing BVI noise.
Figure 1C:
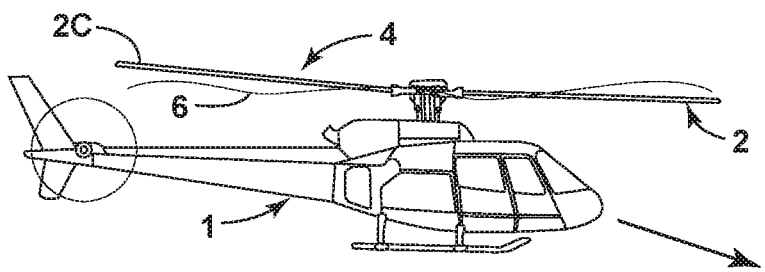
FIG. 1C is a partially schematic side elevational view of a rotorcraft showing wake geometry governing BVI noise.
Figure 1D:
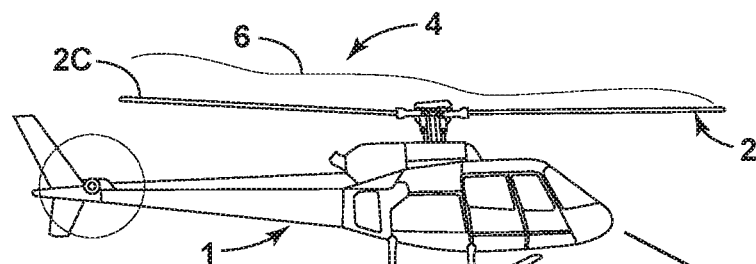
FIG. 1D is a partially schematic side elevational view of a rotorcraft showing wake geometry governing BVI noise.

The intensity of BVI noise is a strong function of the vertical distance between the rotor disc 2 and the shed tip vortices 6. When the helicopter 1 descends along a direct trajectory, the wake will convect below the rear portion 4 of the rotor disc as shown in FIG. 1B resulting in the onset of BVI noise. As the helicopter 1 descends more steeply as shown in FIG. 1C, the wake convects into the rotor disc 2 and the more intense BVI noise occurs. Further increases in the rate of descent as shown in FIG. 1D cause the wake to convect above the rotor disc 2, reducing BVI noise from the peak level. The rates of climb and air speeds where BVI occur are a function of the helicopter's wake, distance, and rotor geometry, and therefore vary between different types of helicopters.

Figure 2:
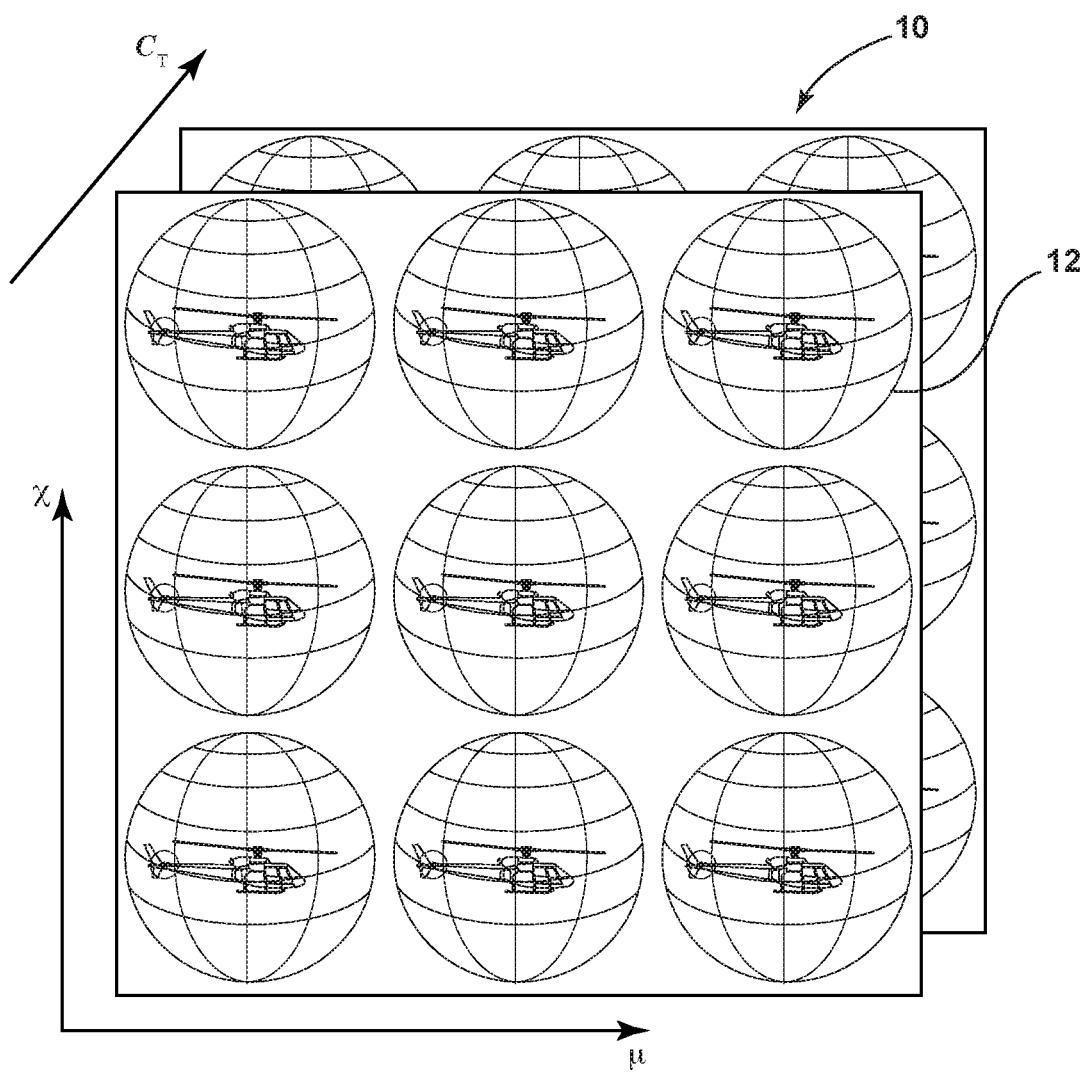
FIG. 2 is a schematic view showing an acoustic sphere database for rotorcraft.

With further reference to FIG. 2, a Fundamental Rotorcraft Acoustic Modeling from Experiments (FRAME) models includes a plurality of acoustic spheres 12. As discussed in more detail below, a plurality of acoustic spheres 12 for a specific helicopter 1 may be predefined, and specific noise predictions can be determined while the helicopter 1 is in flight by determining which acoustic spheres 12 are closest to the current operating conditions using measured data, followed by interpolation utilizing multiple acoustic spheres 12. As discussed in more detail in Greenwood, E., Rau, R., May, B., and Hobbs, C., "A Maneuvering Flight Noise Model for Helicopter Mission Planning," American Helicopter Society 71st Annual Forum, May 2015, the FRAME database may comprise a FRAME-QS database. In general, the FRAME model 10 may be calibrated to measured noise data for 3 flight conditions, and the model may be applied to generate an extensive database for acoustic source noise spheres 12. The spheres 12 may include far-field noise radiation levels as a function of a directivity angle and flight condition. The database 10 may include contributions from both the main rotor 2 (FIG. 1) and tail rotor 3.

According to one example, the FRAME model may be utilized to generate 780 acoustic spheres 12. The acoustic sphere database 10 including the following variables:

|  |  | Nondimensional | Dimensional | # |
| --- | --- | --- | --- | --- |
| Advanced Ratio | $\mu$ | 0.02 to 0.33 | 2 kts to 140 kts | 13 |
| Thurst Coefficient | $C_T$ | 0.0027 to 0.0074 | 0.7 g $n_z$ to 2.0 g $n_z$ | 6 |
| Wake Skew Ratio | $\chi$ | −0.22 to 0.44 | +12° FPA to −24° FPA | 10 |

As discussed above, the FRAME database 10 and spheres 12 are generally known, such that a detailed description of the FRAME database 10 and spheres 12 is not believed to be necessary.

Figure 3:
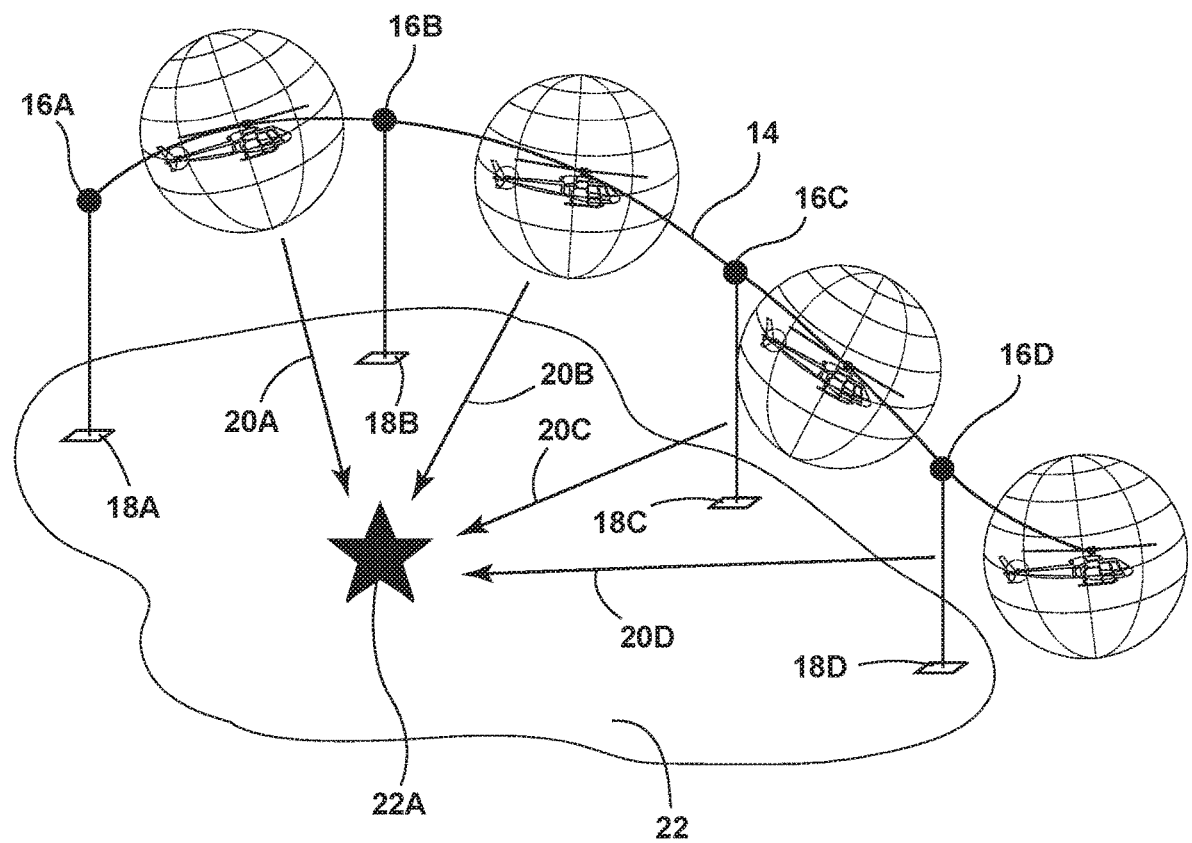
FIG. 3 is a schematic view showing noise propagation to a ground surface during rotorcraft flight.

With further reference to FIG. 3, in flight, helicopter 1 may move along a flight path 14 that includes points 16A-16D. As discussed in more detail below, straight ray propagation to a point 22A of ground surface 22 may be utilized to determine noise levels on the ground 22. The use of linear model allows atmospheric absorption of A-weighted sound pressure levels (SPL) to be precomputed for each direction.

Figure 4:
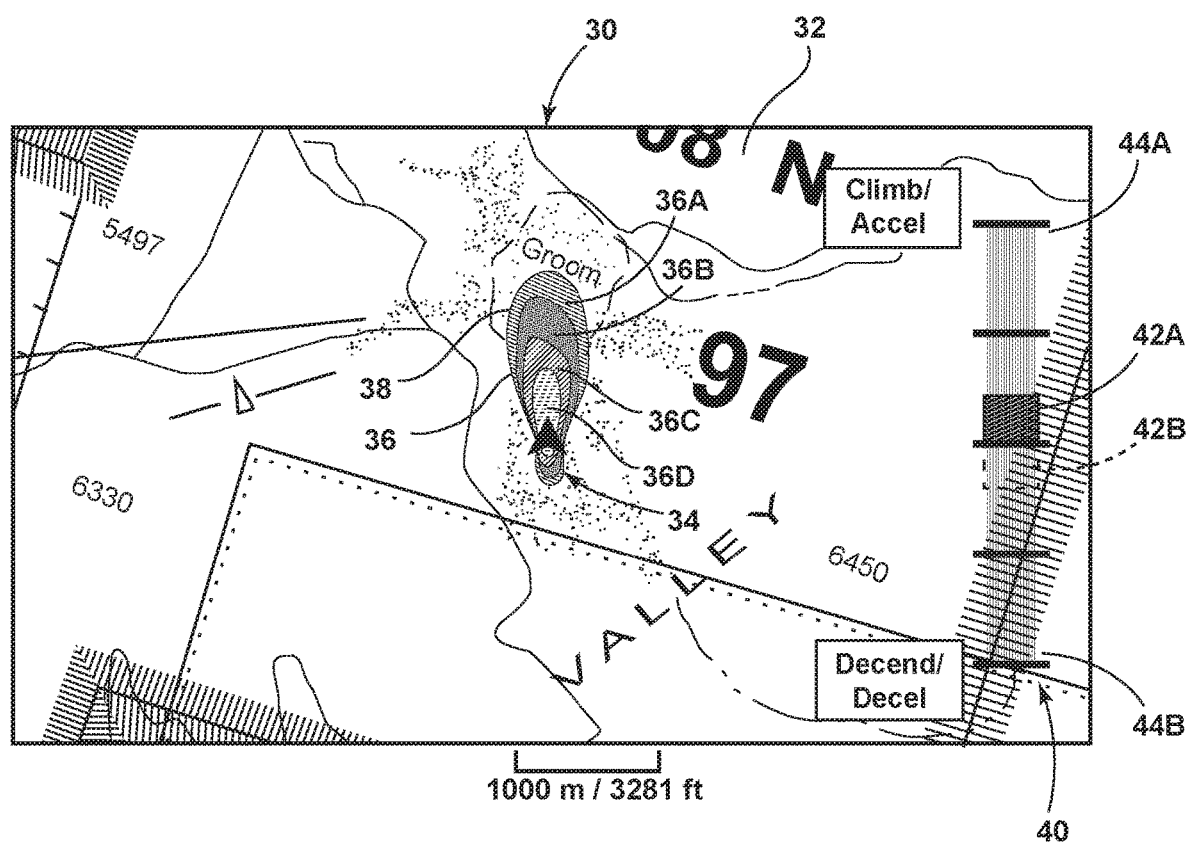
FIG. 4 is a partially fragmentary view of a map including real-time noise display.
Figure 4A:
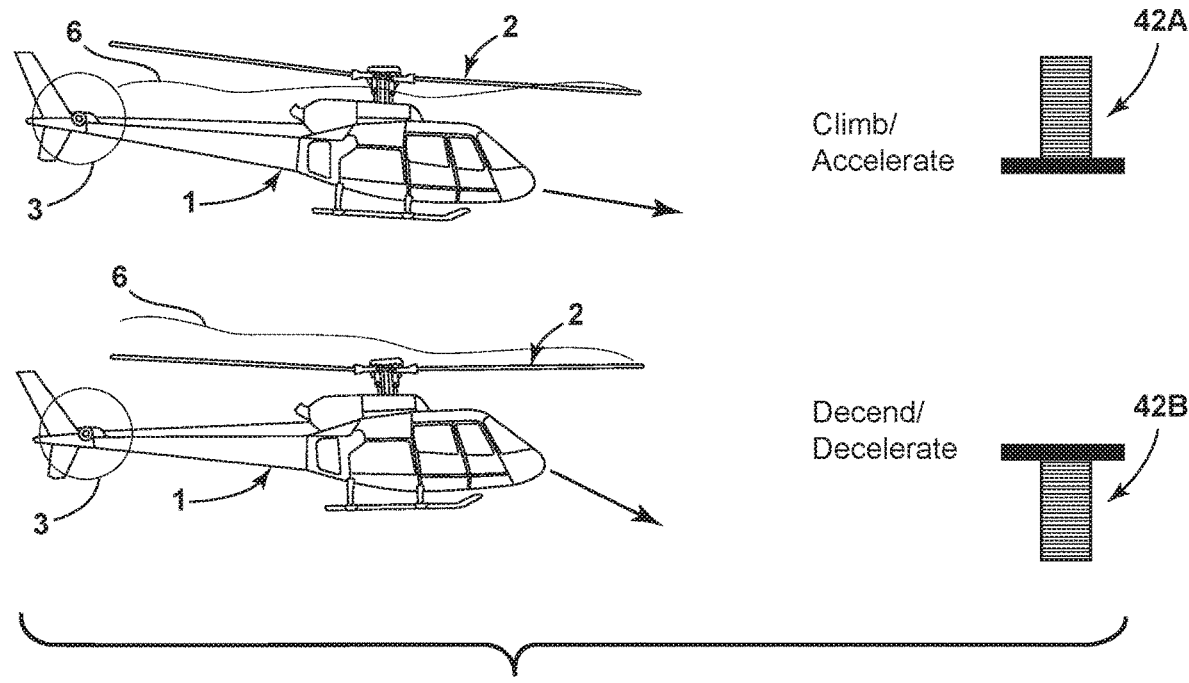
FIG. 4A is a schematic view showing BVI avoidance guidance for a rotorcraft operator.

With further reference to FIGS. 4 and 4A, the calculated ground noise levels can be utilized to determine a noise footprint 36 having a perimeter 38 that corresponds to a predefined "annoyance threshold". The annoyance threshold may be, for example, 65 dBA, or other volume level. The noise footprint 36 may comprise a colored region that is superimposed on a map 32 showing features on the ground below and adjacent the helicopter 1. A helicopter symbol 34 in the form of an arrow may also be superimposed on the map 32. The real-time display 30 may be positioned in the helicopter for viewing by the pilot during flight. The noise footprint 36 may include regions 36A-36D corresponding to increasing ground noise levels within the perimeter 38. The regions 36A-36D may be color-coded to provide the pilot with information concerning the different noise levels on the ground. For example, outer region 36A (lower noise level) may be blue, and the highest noise region 36D may be red. The regions 36B and 36C may be, for example, yellow, green, or other "intermediate" colors.

The real-time display 30 may also include a BVI avoidance guidance feature or display 40. BVI avoidance feature 40 may comprise, for example, colored bars 42A and 42B that change in size. For example, if a maximum climb must be executed to minimize BVI, the bar 42A may extend to the level "44A". However, if the helicopter 1 must descend and/or deaccelerate at a maximum rate, the bar 42B may extend to the level designated "44B". It will be understood that other types of BVI avoidance feedback such as noise (e.g. voice commands to climb or descend), vibrations, or the like may be utilized.

Figure 5:
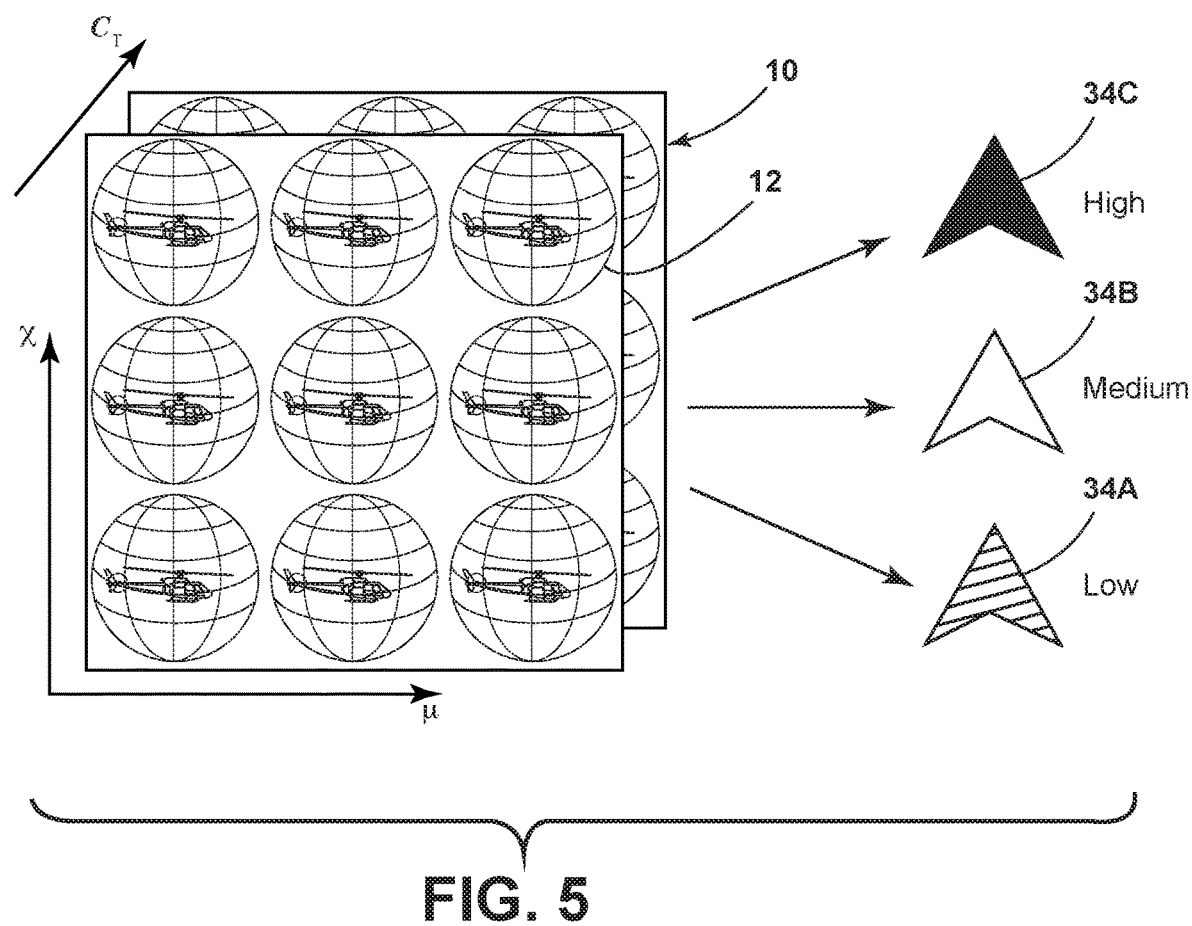
FIG. 5 is a schematic view showing noise intensity.

With further reference to FIG. 5, the FRAME database 10 and acoustic spheres 12 may be utilized to compute an average noise level across each acoustic sphere 12. This is a measurement of the overall source noise intensity. This source noise intensity can also be communicated to the pilot during flight, thereby providing real-time feedback to the pilot. For example, the helicopter symbol 34 may change colors to provide an indication of low, medium and high source noise levels 34A-34C, and these colors may be utilized in the real-time display 30 (FIG. 4).

Figure 6:
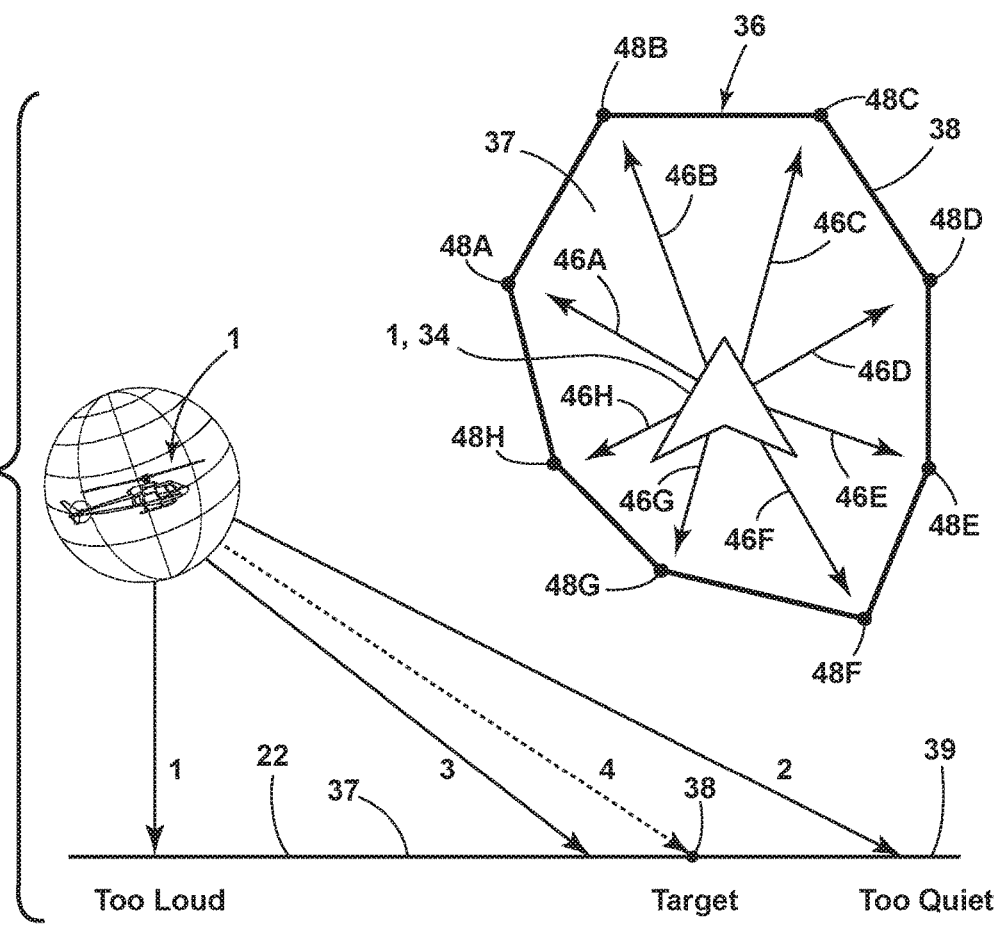
FIG. 6 is a schematic view showing calculation of the boundary of a high noise region on the ground below a rotorcraft.

With further reference to FIG. 6, the perimeter 38 of noise footprint 36 may be calculated at individual bearing directions 46A-46H. The region 37 inside the perimeter 38 of ground surface 22 will experience a noise level that is above the predefined allowable limit (e.g. 65 dBA), and the region 39 outside perimeter 38 have a noise level below the predefined threshold. As discussed in more detail below, the points 48A-48H on perimeter 38 corresponding to bearing directions 46A-46H, respectively, are calculated utilizing a branch-and-bound algorithm. Branch-and-bound algorithms are generally known such that a detailed description is not provided herein. The calculation of the perimeter 38 assumes that noise decreases monotonically with increasing range.

Figure 7:
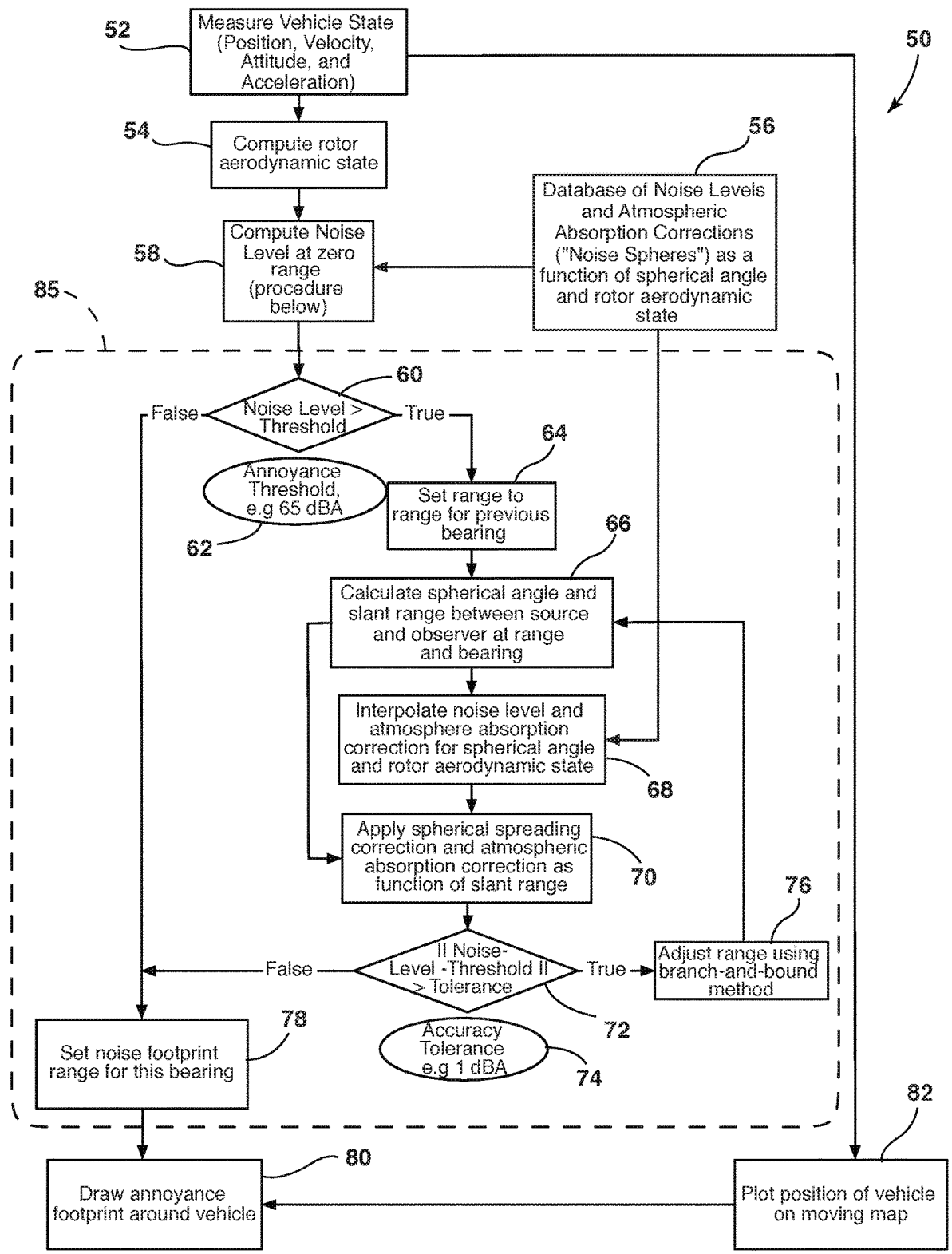
FIG. 7 is a flow chart showing noise footprint calculation.

With reference to FIG. 7, a process or method 50 may be utilized to determine the noise footprint 36 while a rotorcraft such as a helicopter is in flight. At step 52, the vehicle (e.g. helicopter) state is measured. The measured state may include position, velocity, attitude and acceleration. The rotor aerodynamic state is then calculated at step 54. At step 58, the noise level at zero ground range is then determined utilizing noise spheres database 56. The database 56 comprises noise levels and atmospheric absorption corrections (e.g. noise spheres 12) as a function of spherical angle and rotor aerodynamic state. The zero ground range of step 58 generally corresponds to the ground positions 18A-18D directly below points 16A-16D of FIG. 3.

After the zero range noise level is computed, the calculated noise level is then compared to the predefined threshold 62 (e.g. 65 dBA) at step 60. If the calculated noise level is not greater than the threshold, the process continues to step 78, and the noise footprint range is set for this bearing (see also FIG. 6). If the calculated noise level is greater than the threshold at step 60, the process then continues to step 64, and the range is set to the range for the previous bearing. It will be understood that the range of step 64 is a ground range variable that is reset during the process 50.

The process then continues to step 66 and the method calculates the spherical angle and slant range between the source (e.g. helicopter 1) and an observer on the ground at the range variable and the specific bearing. Each of the steps within the dashed region 85 of FIG. 7 are repeated for each bearing direction 46A-46H (FIG. 6). The slant range of step 66 generally corresponds to the length of the arrows 1-4 of FIG. 6.

The process then continues to step 68. At step 68, the noise level is interpolated from spheres 12 of database 10 and the atmosphere absorption correction is also interpolated from the spherical angle and rotor aerodynamic state. As shown schematically in FIG. 7, the interpolation of step 68 utilizes the noise spheres database 56.

At step 72, the difference between the calculated noise level and the threshold is then compared to an accuracy tolerance. The accuracy tolerance may be, for example, 1 dBA (oval 74). If the difference between the noise level and the threshold 62 is not greater than the tolerance 74, the process continues to step 78, and the noise footprint is set for this bearing (e.g. one of 46A-46H of FIG. 6). If the difference between the calculated noise level and the threshold 62 is greater than the accuracy tolerance 74, the process continue to step 76, and the range is adjusted using a branch-and-bound method or algorithm. The branch-and-bound algorithm of step 76 may comprise a known algorithm. The process then moves back to step 66 following step 76. Steps 66, 68, 70 and 72, are then repeated, until the difference between the noise level and the threshold is less than the tolerance at step 72, in which case the process continues to step 78.

At step 80, the annoyance or noise footprint 36 (FIG. 4) is then drawn around the vehicle and displayed. Process 50 also includes plotting the position of the vehicle (e.g. helicopter 1) as shown at step 82. As discussed above, the position of the vehicle on a map 32 may comprise a helicopter symbol 34 as shown in FIG. 4.

Figure 8:
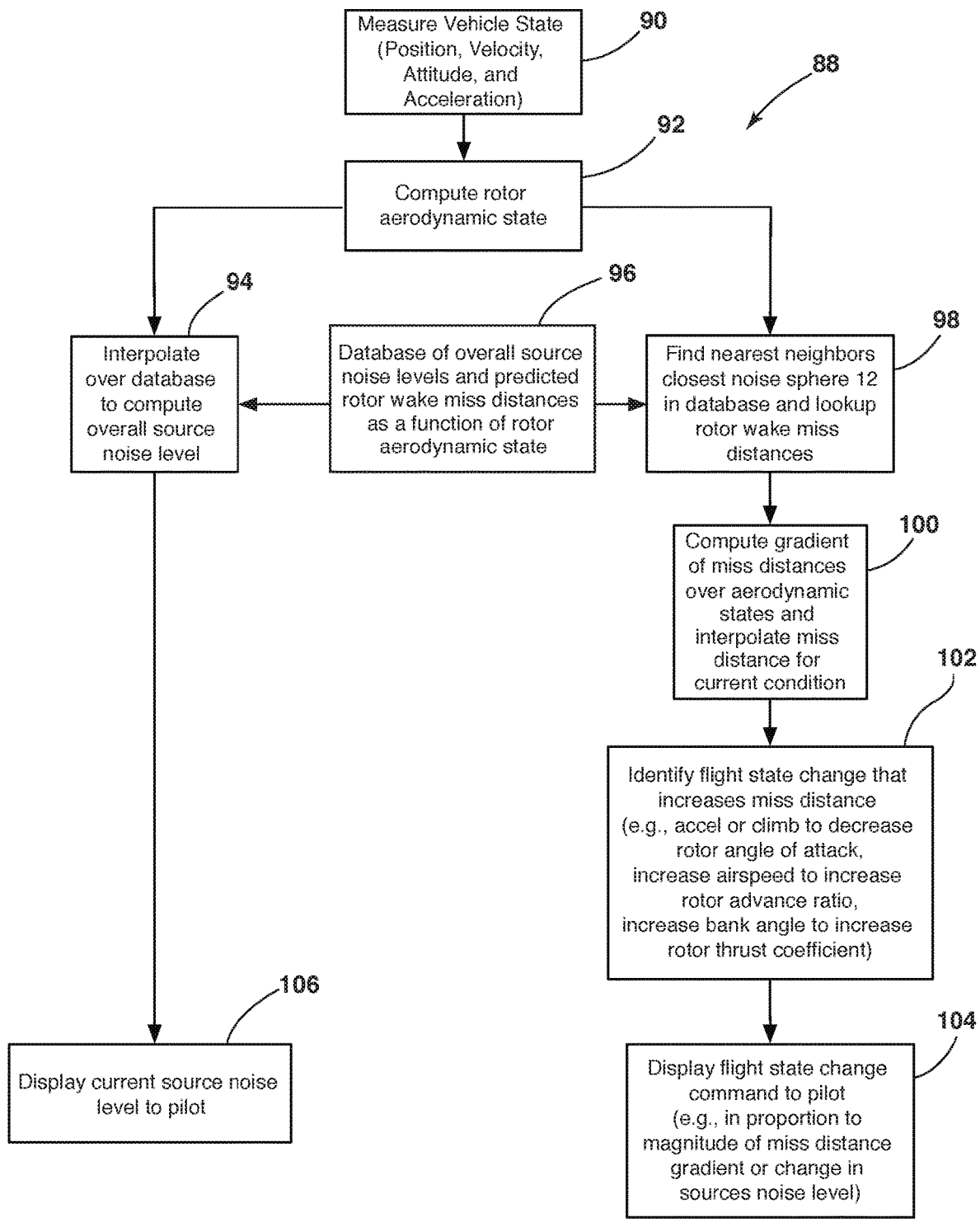
FIG. 8 is flow chart showing a method of providing flight state change information to a rotorcraft operator.

With further reference to FIG. 8, a method of process 88 may be utilized to provide a pilot with flight state change information and/or information concerning the current source noise level of the helicopter 1. At step 90, the vehicle state is measured, and the rotor aerodynamic state is determined at step 92. The process 88 utilizes a database 96 of overall source noise levels and predicted rotor wake distances as a function of rotor aerodynamic state. The database 96 is generally described in Greenwood, E., "Real Time Helicopter Noise Modeling for Pilot Community Noise Awareness," presented at NOISE-CON 2017, Grand Rapids, Mich. June 2017, such that a detailed description herein is not believed to be necessary. The term "miss distance" generally refers to the separation between the vortices 6 (e.g. FIGS. 1A-1D) that make up the rotor wake and the rotor blades 2A-2C during Blade-Vortex Interaction. The resulting noise is a strong function of the miss distance.

After the rotor aerodynamic state is determined at step 92, the database 96 is interpolated to determine an overall source noise level at step 94, and the source noise level is communicated to the pilot at step 106. The current source noise level may be communicated via a visual display (e.g. symbols 34A, 34B, 34C, FIG. 5), audio, or other suitable means.

The process 88 also includes step 98. At step 98, the nearest neighbors (e.g. closed noise spheres 12) in the database 96 are located, in the rotor wake miss distances are looked up; it will be understood that a database of miss distances as a function of the rotor aerodynamic state or a database of noise spheres as a function of rotor aerodynamic state could be utilized if only BVI avoidance guidance or only a noise footprint display respectively, is required.

At step 100, the process computes a gradient of miss distances over the aerodynamic states and a miss distance for the current condition is interpolated. At step 102, the process identifies a flight state change that increases the miss distances. For example, the miss distance in a given situation may be increased by 1) accelerating or climbing to decrease rotor angle of attack, 2) increasing air speed to increase the rotor advance ratio, and/or 3) increasing bank angle to increase rotor thrust coefficient.

At step 104, the flight state change command is displayed to a pilot. The flight state change may comprise a visual indicator 42A or 42B (FIGS. 4 and 4A), or other suitable communication feature For example, in FIG. 4, the indicator 42A may rise to the line 44A if a large magnitude of missed distance gradient is present relative to the climb or acceleration of helicopter 1. It will be understood that the variable size bars 42A and 42B of FIGS. 4 and 4A are merely one example of a feature configured to communicate flight change information to a rotorcraft operator. Other indicators (e.g. sound, vibration of a control feature, etc.) may be utilized to communicate fight change information to the pilot.

Figure 9:
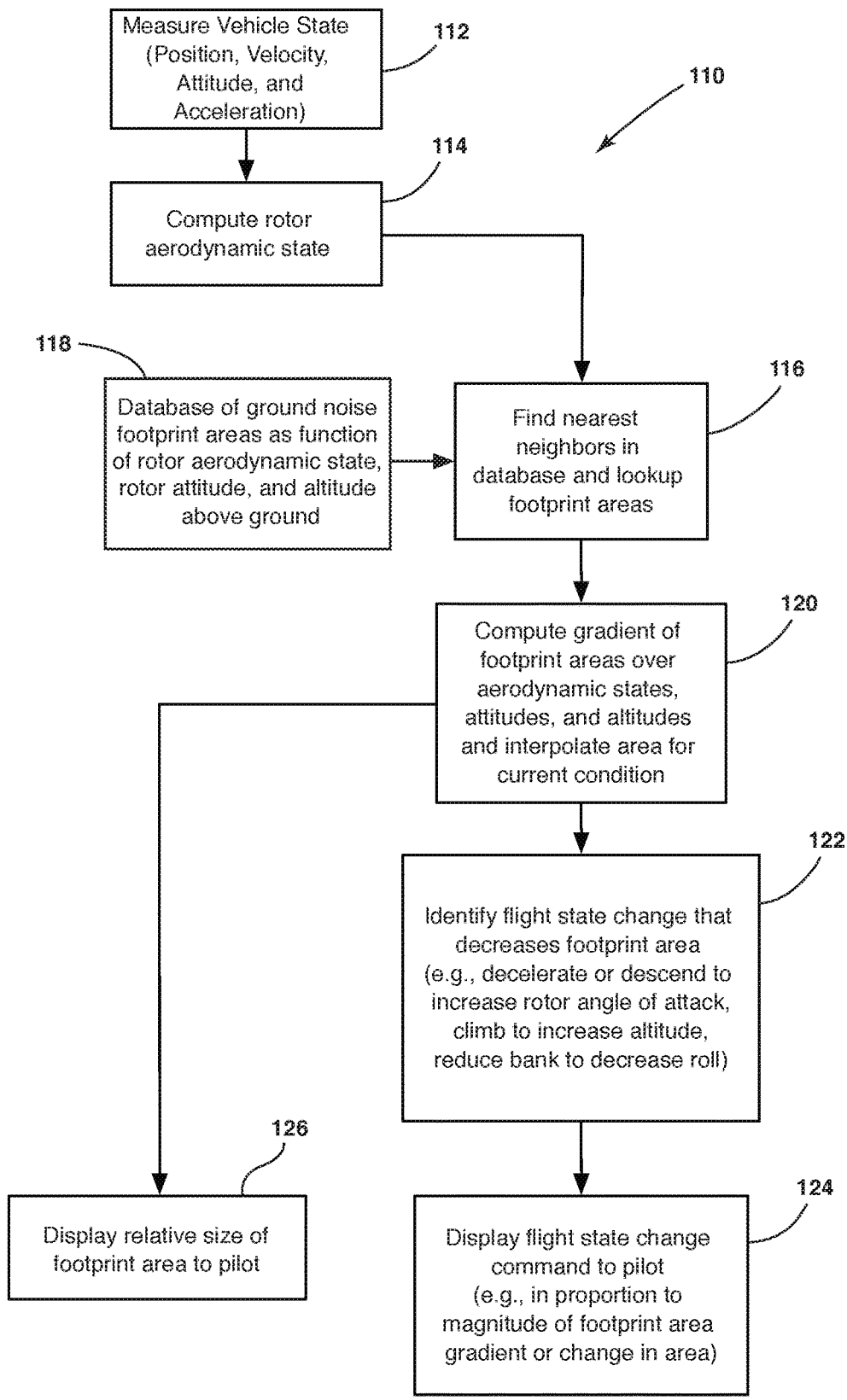
FIG. 9 is a flow chart showing an alternative method of providing flight state change information to a rotorcraft operator.

With further reference to FIG. 9, in an alternative method 110, a database 118 including footprint areas (instead of, or in addition to the acoustic spheres 12 used to generate the footprints in real-time). As discussed below, the footprint areas of database 118 are looked up as a function of the rotor aerodynamic state in a manner that is somewhat similar to the manner in which the acoustic spheres 12 are looked up. However, the footprint areas of database 118 are also looked up based on rotor attitude (pitch and roll) and the altitude of the helicopter 1 above the ground.

At step 112 of method 110, the vehicle state is measured and the rotor aerodynamic state is computed at step 114. At step 116, the nearest neighbors in the database 110 are located, and the footprint areas are looked up. The "nearest neighbors" are the footprint areas in the database 118 that surround the current condition (aerodynamic state, attitude, altitude) from which the method 110 interpolates the current footprint area, and also calculates the gradient of the footprint area versus the perimeters defining the condition (e.g. change in footprint area versus change in roll angle). It will be understood that the footprint areas of database 118 are the areas inside the ground noise annoyance footprint, calculated in the same way as is done for the moving map display 30 as discussed above. However, in the process 110, the footprint areas are calculated in advance and stored in database 118. This is advantageous because the noise abatement guidance can include the effects of changing the helicopter's altitude and attitude on noise levels on the ground, instead of only reducing noise at the source as in the miss-distance based guidance process described above in connection with FIG. 8. However, the process 110 may require more computer memory because the database is a function of 7 variables instead of just the 4 variables required to define the rotor aerodynamic state.

At step 120, the process 110 computes the gradient of footprint areas over aerodynamic states, attitudes, and altitudes, and interpolates the area for the current condition. The relative size of the footprint area is displayed to the pilot at step 126. At step 122, the flight state change that decreases footprint area is identified. The flight state change may require the helicopter 1 to deaccelerate or descend to increase rotor angle of attack, climb to increased altitude, or reduce bank to decrease roll.

At step 124, the flight state change information (command) is displayed to the pilot. This information may be communicated to the pilot utilizing the bars 42A and 42B of FIGS. 4 and 4A, and the size of the bars 42A and 42B may be in proportion to a magnitude of footprint area gradient or change in area.

The present disclosure provides a computationally efficient and accurate rotor source noise model. The hardware to implement the process may be installed/implemented on existing rotorcraft as an after-market add-on. The noise abatement system/process may also be provided in new rotorcraft. The system provides a low cost, effective way to reduce rotorcraft noise impact.

What is claimed is:

1. A method of providing a rotorcraft operator with real-time information concerning rotorcraft acoustic radiation of a region on the ground in the vicinity of the rotorcraft, the method comprising:

utilizing a noise radiation model and at least one flight variable that is measured while the rotorcraft is in flight to determine an annoyance footprint on the ground that is bounded by a predefined noise level threshold, such that the noise level within the annoyance footprint exceeds the predefined noise level threshold, wherein utilizing the noise radiation model includes;

generating a database of acoustic source models as a function of emission angle and operating states as parameterized by a set of nondimensional parameters for each rotor of the rotorcraft;

generating an acoustic model representing the current rotorcraft operating state by interpolating the noise levels contained in each source noise level of the database by the nondimensional rotor operating states for each rotor;

estimating a nondimensional rotor operating state for each rotor of the rotorcraft, as a function of the at least one flight variable;

generating a model representing the total noise of the rotorcraft at the current operating state by interpolating the noise levels contained in each source noise level by the nondimensional rotor operating states for each rotor of the rotorcraft and summing the contributions for each rotor;

determining an orientation of the rotorcraft relative to the ground;

orienting the current full vehicle acoustic model with the determined orientation of the rotorcraft, relative to the ground;

determining an annoyance range from the rotorcraft at which ground noise levels meet the predefined noise level threshold for each of a plurality of bearings around the rotorcraft;

generating a visual display including the annoyance footprint superimposed on a map, the visual display including an indicator showing the position of the rotorcraft on the map; and wherein:

the annoyance footprint and the rotorcraft position indicator are rapidly updated at small time intervals while the rotorcraft is in flight to thereby provide the rotorcraft operator with the real-time information concerning estimated acoustic radiation on the ground in the vicinity of the rotorcraft due to noise from the rotorcraft.

2. The method of claim 1, wherein:

each acoustic source model comprises far-field noise radiation levels as a function of spherical angle and rotor aerodynamic state; and including determining a spherical angle and a rotor aerodynamic state utilizing the at least one measured flight variable corresponding to a slant range variable; and determining a ground noise level by interpolating a noise level for the spherical angle corresponding to the slant range variable and rotor aerodynamic state.

3. The method of claim 2, further comprising:

comparing the ground noise level to the predefined noise level threshold; and adjusting the slant range variable and repeating the step of determining a ground noise level by interpolating a noise level for the spherical angle corresponding to a slant range variable and rotor aerodynamic state to determine the boundary of the annoyance footprint.

4. The method of claim 3, wherein:

the steps of comparing the ground noise level to the predefined noise level threshold and adjusting the slant range variable and repeating the step of determining a ground noise level by interpolating a noise level for the spherical angle corresponding to a slant range variable and rotor aerodynamic state to determine the boundary of the annoyance footprint are repeated for each of the plurality of bearings around the rotorcraft.

5. The method of claim 4, wherein:

the slant range variable corresponds to a ground range variable; and the ground range variable is adjusted utilizing a branch-and-bound algorithm when the magnitude of the difference between the noise level and a predefined noise level threshold exceeds a predefined accuracy tolerance.

6. The method of claim 4, wherein:

the database comprises atmospheric absorption corrections; and determining a ground noise level includes interpolating atmospheric absorption corrections from the database.

7. The method of claim 4, wherein:

a ground distance from the rotorcraft to the boundary of the annoyance footprint comprises a noise footprint range; and the noise footprint range for the bearing direction is set equal to the noise footprint range for a previous bearing direction if the magnitude of the difference between the ground noise level and the predefined noise level threshold is greater than the predefined accuracy tolerance.

8. The method of claim 1, further comprising:

identifying a flight state change that decreases a size of the annoyance footprint and/or that increases a miss distance and/or that reduces a source level of noise generated by the rotorcraft;

providing the rotorcraft operator with noise abatement guidance concerning changes in the rotorcraft operation that will decrease a size of the annoyance footprint and/or that will increase a miss distance and/or that will reduce a source level of noise generated by the rotorcraft.

9. The method of claim 8, further comprising:

determining a current rotor aerodynamic state; and utilizing a database of overall source noise levels and predicted rotor wake miss distances as a function of rotor aerodynamic state to compute a gradient of miss distances over aerodynamic states, and to interpolate a miss distance for the current rotor aerodynamic state.

10. The method of claim 9, further comprising:

displaying current source noise level to the rotorcraft operator.

11. The method of claim 8, further comprising:

determining a current rotor aerodynamic state;

utilizing a database of ground noise footprint areas as a function of rotor aerodynamic state, rotor attitude, and altitude above ground to determine a gradient of footprint areas over aerodynamic states, attitudes, and altitudes, and interpolate a footprint area for the current rotor aerodynamic state.

12. The method of claim 10, further comprising:
displaying a relative size of the footprint area to the rotorcraft operator.

13. A method of providing a rotorcraft operator with real-time information concerning rotorcraft acoustic radiation of a region on the ground in the vicinity of the rotorcraft, the method comprising:
utilizing a noise radiation model and at least one flight variable that is measured while the rotorcraft is in flight to determine a rapidly updated annoyance footprint on the ground that is bounded by a predefined noise level threshold, such that the noise level within the annoyance footprint exceeds the predefined noise level threshold, wherein utilizing the noise radiation model to determine the boundary of the annoyance footprint includes;
  utilizing a database comprising a plurality of acoustic source models, each acoustic source model comprising far-field noise radiation levels as a function of spherical angle and rotor aerodynamic state;
  determining a spherical angle and a rotor aerodynamic state utilizing the at least one measured flight variable corresponding to each of a plurality of slant range variables;
  determining a plurality of ground noise levels by interpolating a noise level for the spherical angle corresponding to each of the plurality of slant range variables and the rotor aerodynamic state;
  utilizing the plurality of determined ground noise levels to determine a boundary of the noise footprint that corresponds to the annoyance threshold; and
providing the rotorcraft operator with the real-time information concerning the boundary of the annoyance footprint in the vicinity of the rotorcraft due to noise from the rotorcraft.

14. The method of claim 13, including:
generating a visual display including the annoyance footprint superimposed on a map, the visual display including an indicator showing the position of the rotorcraft on the map.

15. The method of claim 13, further comprising:
comparing the ground noise level to the predefined noise level threshold.

16. The method of claim 15, wherein:
the steps of comparing the ground noise level to the predefined noise level threshold and adjusting the slant range variable and repeating the step of determining a ground noise level by interpolating a noise level for the spherical angle corresponding to each of the plurality of slant range variables and rotor aerodynamic state to determine the boundary of the annoyance footprint region are repeated for a plurality of bearing directions.

17. The method of claim 16, wherein:
each of the plurality of slant range variables corresponds to a respective ground range variable; and
the respective ground range variable is adjusted utilizing a branch-and-bound algorithm if the magnitude of the difference between the noise level and a predefined noise level threshold exceeds a predefined accuracy tolerance.

18. The method of claim 16, wherein:
the database comprises atmospheric absorption corrections; and
determining a ground noise level includes interpolating atmospheric absorption corrections from the database.

19. The method of claim 13, further comprising:
identifying a flight state change that decreases a size of the annoyance footprint and/or that increases a miss distance and/or that reduces a source level of noise generated by the rotorcraft;
providing the rotorcraft operator with noise abatement guidance concerning changes in the rotorcraft operation that will decrease a size of the annoyance footprint and/or that will increase a miss distance and/or that will reduce a source level of noise generated by the rotorcraft.

20. The method of claim 19, further comprising:
determining a current rotor aerodynamic state; and
utilizing a database of overall source noise levels and predicted rotor wake miss distances as a function of rotor aerodynamic state to compute a gradient of miss distances over aerodynamic states, and to interpolate a miss distance for the current rotor aerodynamic state.

* * * * *